Inventor
Donald R. Skeffington
By his Attorney

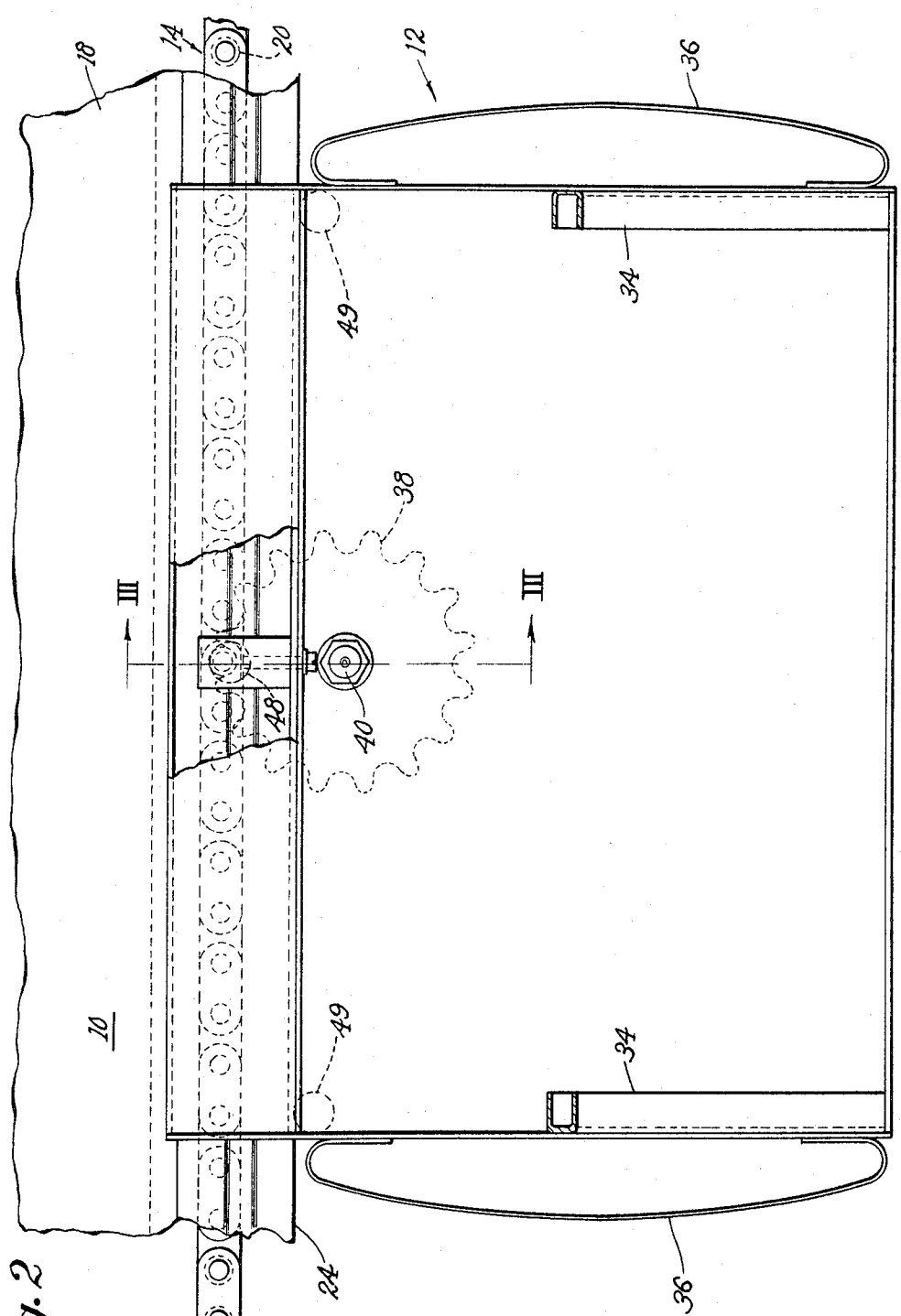

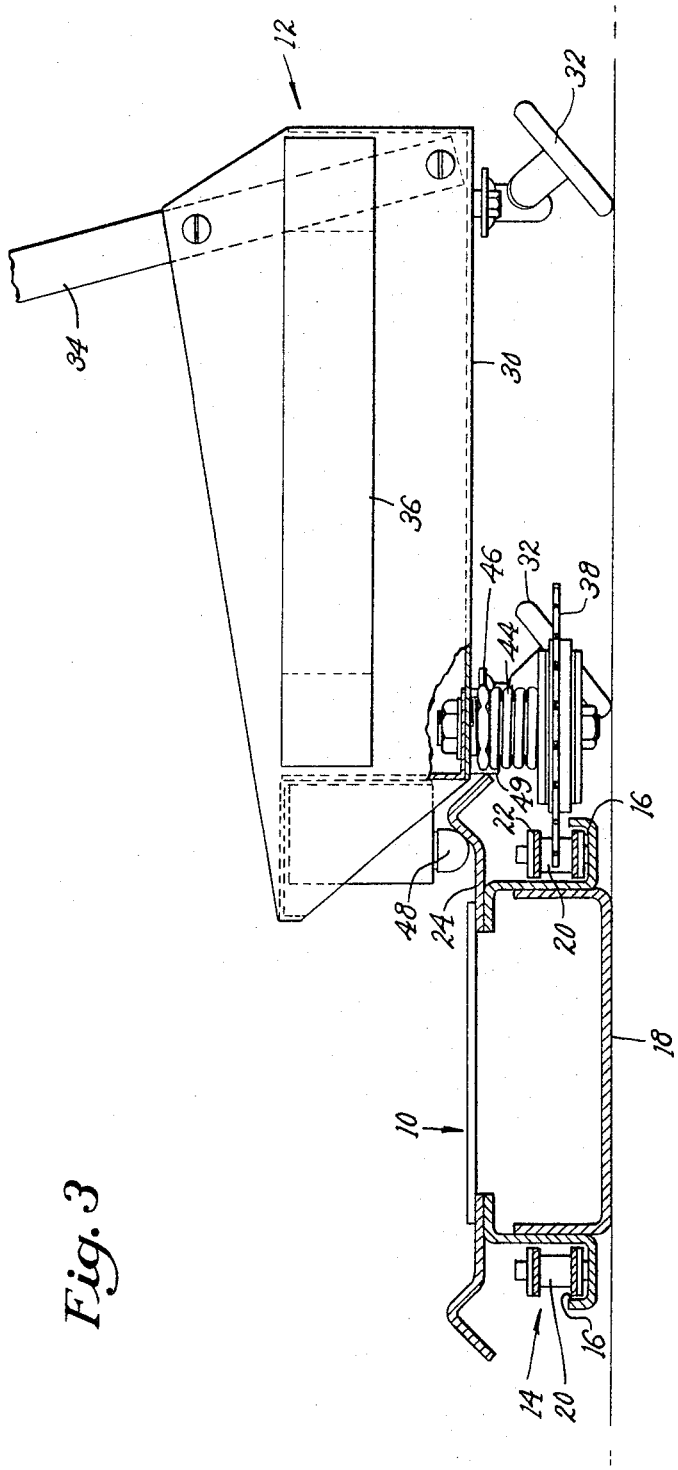

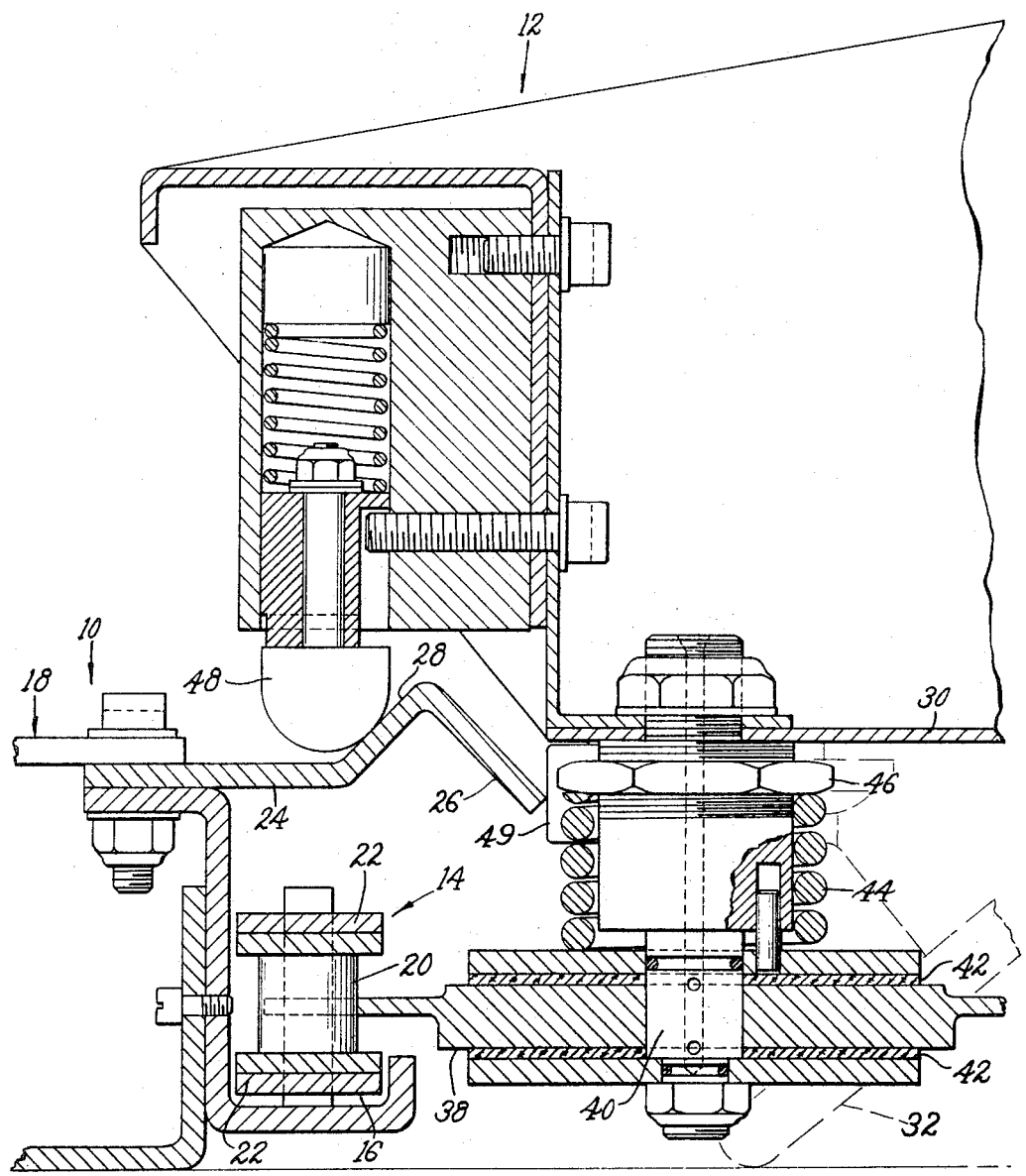

United States Patent Office 3,269,330
Patented August 30, 1966

3,269,330
CONVEYOR SYSTEMS
Donald R. Skeffington, Ipswich, Mass., assignor to United Shoe Machinery Corporation, Flemington, N.J., and Boston, Mass., a corporation of New Jersey
Filed May 29, 1964, Ser. No. 371,204
2 Claims. (Cl. 104—172)

This invention relates generally to conveyor systems of the type in which article carrying racks are moved between work stations by a floor mounted conveyor chain and has particular reference to such a system in which novel means is provided for effecting releasable engagement of the article carrying device with the conveyor chain.

In Patent 3,130,685 issued April 28, 1964, there is disclosed an article handling system comprising individual racks which are adapted to be moved between work stations by a floor mounted conveyor chain. The racks are each provided with a towing mechanism for engagement by the chain, and rack arresting stop mechanisms are providing alongside the chain at each work station and at other predetermined positions to form rack pooling stations.

For reasons of safety, provision is also made for effecting automatic release of the rack from the driving chain if the rack collides with a person or other object. In the device disclosed in the above-identified patent a bumper is provided on the forward end of the rack, said bumper being so connected to the towing mechanism as to cause disengagement thereof from the chain when the bumper encounters an obstruction.

Although the bumper device disclosed in the above-identified patent has been found to operate satisfactorily, it increases the cost of the rack and is subject to damage during handling of the racks when they are away from the conveyor. In some installations it is desirable that the rack be capable of traveling in both directions, in which case a bumper on both ends of the rack is required. The cost of the rack and the susceptibility to damage are thereby increased.

An object of this invention is to provide a conveyor system of the type described in which an article carrying device is provided with friction drive means for engagement with the conveyor means.

A further object of the invention is to provide a conveyor system of the type described in which the article carrying devices are provided with drive means suitable for driving the devices in either direction.

A further object of the invention is to provide a conveyor system comprising a floor mounted conveyor chain which is adapted to cooperate with friction drive means of an article carrying device, with means being provided to releasably retain the friction drive means in operative relation to the conveyor chain.

Other objects of the invention will be apparent to one skilled in the art.

In the drawings,

FIG. 2 is a top plan view of the article carrying device and conveyor chain of FIG. 1;

FIG. 3 is a view in section taken on line III—III of FIG. 2; and

FIG. 4 is an enlarged sectional view of a portion of FIG. 3 illustrating in greater detail the construction of the friction drive mechanism and the means for releasably retaining the article handling device in operative relation to the chain.

Figure 1:
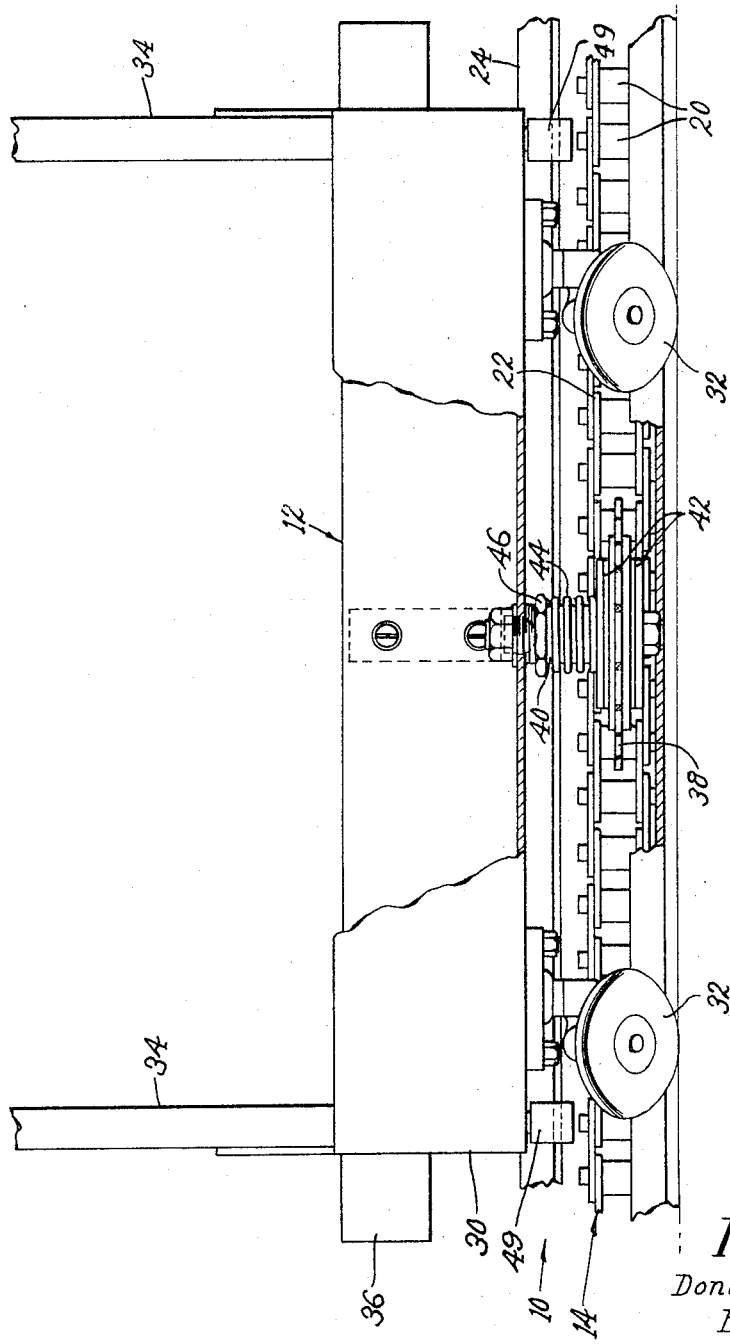
FIG. 1 is a view in side elevation of a conveyor chain and article carrying device embodying the features of the invention, disposed in operative relation.

Referring to the drawings there is illustrated a conveyor system embodying the features of the invention, which comprises a floor mounted conveyor 10 and an article carrying device such as a rack 12 for cooperation therewith.

In the illustrated embodiment the conveyor 10 comprises an endless tow chain 14 which travels in a pair of spaced guide channels 16 disposed on opposite sides of a center housing 18. The chain, during normal operation of the system is driven continuously in one direction, which in the illustrated embodiment is to the right as seen in FIGS. 1 and 2. The chain is of the type commonly known as a roller chain and comprises a series of spaced vertical members 20 retained in position by upper and lower spacing plates 22. To provide means for retaining the rack in operative relation to the conveyor chain, a cover 24 is disposed over each run of the chain, the outer edge of each of said covers having a downwardly sloping cam surface 26 leading to a shoulder portion 28 for a purpose to appear hereinafter.

The rack 12 comprises a base 30 having casters 32 mounted thereon to enable the rack to be moved freely in any direction. Extending upwardly from the base are support columns 34 on which may be disposed any convenient supporting structure for the articles to be carried by the rack. Disposed at each end of the rack is a spring bumper 36 to permit collision between adjacent racks without damage to the articles being carried.

To provide means for engagement with the conveyor chain, a drive sprocket 38 is mounted below the rack base on a suitable shaft 40, which is non-rotatably mounted on the rack base. In the illustrated embodiment the drive sprocket is disposed between a pair of friction disks 42, said disks being non-rotatably disposed on the shaft 40 and being urged against the drive sprocket by means of a spring 44 which is maintained under compression by an adjusting nut 46.

To provide means for releaseably maintaining the rack in the proper position in relation to the chain 14 so that the sprocket 38 is engaged with the chain, a spring loaded detent 48 is mounted on the side of the rack adjacent the chain. The detent is positioned at an elevation such that when the rack is moved into operative relation to the conveyor by being pushed sideways toward the tow chain, the detent 48 cams itself up the surface 26 and snaps over the shoulder portion 28 of the chain cover 24. For cooperation with the detent in guiding the rack along the conveyor, guide rollers 49 are provided near each end of the rack for rolling contact with the outer edge of the chain cover 24.

During normal operation of the conveyor a rack to be transported thereby may be pushed against the conveyor in the manner described so that the sprocket 38 engages the continuously moving chain. Since the rack at this instant is stationary the drive sprocket will rotate momentarily at a rate corresponding to the chain speed. As the force applied thereto by the chain resulting from the frictional drag of the disks 42 accelerates the rack in the direction of chain motion, the rate of rotation of the sprocket will decrease substantially to zero. When the rack being conveyed reaches a stop mechanism, or collides with a previous rack or with some other obstruction, causing the rack to stop, the drive sprocket, which remains in engagement with the chain, commences to rotate at a speed corresponding to the chain speed. When the stop mechanism is released or the obstruction is removed the rack will again accelerate to the speed of the chain, with the sprocket rotation decreasing to zero as the rack accelerates.

When the rack is stopped at a stop mechanism, or other obstruction, it may be readily removed from operative relation to the conveyor chain by simply pulling it away from the chain, so that the detent becomes disengaged from the chain cover, and the sprocket is disengaged from the chain. The construction of the rack also makes it possible to readily remove a rack from the conveyor chain even when it is positioned between two other racks.

Although in the illustrated embodiment the rack is frictionally engaged with the tow chain by means of the drive sprocket 38, it will be understood that other means may be used to frictionally connect the rack and tow chain, provided that the frictional drag is sufficient to accelerate a loaded rack to an appreciable percentage of the chain speed, yet not so great as to overload the chain drive motor when a plurality of racks are stopped at various positions along the chain.

Since certain obvious modifications may be made in the illustrated embodiment of the invention without departing from the scope thereof, it is intended that all matter contained herein be interpreted in an illustrative and not a limiting sense.

Having thus described my invention, what I claim as new and desire to secure by Letters Patent of the United States is:

1. In a conveyor system, a tow chain, a cover disposed over said tow chain, said cover having an inclined outer portion leading to a shoulder, the outer side of said chain being exposed whereby an article carrying device having a laterally extending chain engaging means and a spring loaded detent may be releasably engaged with said cover with the detent seated behind said shoulder and said chain engaging means engaging the side of the chain.

2. A conveyor system, for conveying article carrying devices between work stations, comprising driving means for driving said article carrying devices along a predetermined path, a cover disposed over said driving means, said cover having an inclined outer portion leading to a shoulder, the outer side of said driving means being exposed whereby an article carrying device having means on one side thereof for engagement with said driving means and a spring loaded detent associated therewith may be releasably engaged with said cover with the detent seated behind said shoulder and said means on said one side of the article carrying device in driven engagement with said driving means.

References Cited by the Examiner

UNITED STATES PATENTS

| 224,347 | 2/1880 | Parker | 104—236 |
| 2,636,446 | 4/1953 | Woodward | 104—172 |
| 3,088,197 | 5/1963 | Cargill | 104—172 X |
| 3,130,685 | 4/1964 | Goodrich et al. | 104—172 |
| 3,198,592 | 8/1965 | Zippel | 104—236 X |

ARTHUR L. LA POINT, *Primary Examiner.*

EUGENE G. BOTZ, *Examiner.*

F. W. MONAGHAN, *Assistant Examiner.*